United States Patent [19]
Zou et al.

[11] Patent Number: 6,140,391
[45] Date of Patent: Oct. 31, 2000

[54] REACTIVE JET INK COMPOSITION

[75] Inventors: Wan Kang Zou, Lake Bluff; FengFei Xiao, Northbrook; Carrie Woodcock, Park Ridge; Shannon Palk, Elmhurst; Qiao Qiao Dong, Carol Stream, all of Ill.

[73] Assignee: Marconi Data Systems Inc., Wood Dale, Ill.

[21] Appl. No.: 09/169,734

[22] Filed: Oct. 9, 1998

[51] Int. Cl.$^7$ .............................. C08G 4/00; C08G 16/02; C08G 16/04; B32B 27/42; C09D 11/10; C08K 5/07; C08L 61/00; C08L 67/02

[52] U.S. Cl. ......................... 523/160; 524/160; 524/542; 524/604; 525/155; 525/473; 428/526

[58] Field of Search ..................................... 523/160, 161; 524/158, 160, 539, 542, 604, 745, 860; 428/447, 481, 482, 526; 525/154, 155, 185, 400, 401, 473, 474

[56] References Cited

U.S. PATENT DOCUMENTS

| | | |
|---|---|---|
| 3,060,429 | 10/1962 | Winston . |
| 3,298,030 | 1/1967 | Lewis et al. . |
| 3,316,189 | 4/1967 | Adams ....................................... 260/13 |
| 3,373,437 | 3/1968 | Sweet et al. . |
| 3,416,153 | 12/1968 | Hertz et al. . |
| 3,661,619 | 5/1972 | Surland .................................. 117/62.2 |
| 3,673,601 | 6/1972 | Hertz . |
| 4,154,891 | 5/1979 | Porter, Jr. et al. ....................... 428/334 |
| 4,343,925 | 8/1982 | Chang et al. ........................... 525/440 |
| 4,477,618 | 10/1984 | Singer et al. ............................ 524/157 |
| 4,694,302 | 9/1987 | Hackelman et al. . |
| 4,707,535 | 11/1987 | Koleske .................................. 528/110 |
| 4,879,337 | 11/1989 | Shibato et al. ........................... 524/504 |
| 4,978,969 | 12/1990 | Chieng . |
| 5,187,019 | 2/1993 | Calbo et al. ............................. 428/524 |
| 5,230,733 | 7/1993 | Pawlowski . |
| 5,334,652 | 8/1994 | Wellman et al. ........................ 524/601 |
| 5,380,769 | 1/1995 | Titterington et al. . |
| 5,412,049 | 5/1995 | Argyropoulos et al. ................. 526/312 |
| 5,621,449 | 4/1997 | Leenders et al. . |
| 5,645,888 | 7/1997 | Titterington et al. . |
| 5,698,478 | 12/1997 | Yamamoto et al. . |
| 5,738,013 | 4/1998 | Kellett . |
| 5,889,083 | 3/1999 | Zhu ......................................... 523/161 |
| 5,914,373 | 6/1999 | Glancy et al. ........................... 525/406 |

FOREIGN PATENT DOCUMENTS

| | | |
|---|---|---|
| 0 465 039 | 1/1992 | European Pat. Off. . |
| 0 604 024 | 6/1994 | European Pat. Off. . |
| 0 641 669 | 3/1995 | European Pat. Off. . |
| 0 652 320 | 5/1995 | European Pat. Off. . |
| 0 672 538 | 9/1995 | European Pat. Off. . |
| 0 739 956 | 10/1996 | European Pat. Off. . |
| 62-231787 | 10/1987 | Japan . |
| 40108 | 10/1997 | WIPO . |

OTHER PUBLICATIONS

"Beetle 65 Methylated Ureaformaldehyde Resin," *Cytec Industries Inc.*, (Nov. 1993).
"BYK–370 Reactive Silicone Surface Additives," *BYK Chemie Data Sheet*, Germany (1995).
"Catalysis and Crosslinking of CYMEL 303 Hexamethoxymethylmelamine," *Cytec Indrustries Inc.*, (1993).
"CYCAT 500 Catalyst," *Cytec Industries Inc.*, (1990).
"CYCAT 600 Catalyst," *Cytec Industries Inc.*, (1989).
"CYMEL 303 Crosslinking Agent," *Cytec Industries Inc.*, (1995).
"High Solids Amino Crosslinking Agents," *Cytec Industries Inc.*, (1997).
"Kat–Nips–Acid Catalysts," *King Industries Specialty Chemicals*, 10 1, (1995).
Keeling, M.R., "Ink Jet Printing," *Phys. Technol.*, 12 (5), 196–203 (1981).
"K–Flex 171–90 Product Data Sheet," *King Industries Specialty Chemicals*, (1997).
"K–Flex 188 Product Data Sheet," *King Industries Specialty Chemicals*, (1997).
"K–Flex 3305 Product Data Sheet," *King Industries Specialty Chemicals*, (1997).
"K–Flex XM–3322 Product Data Sheet," *King Industries Specialty Chemicals*, (1998).
Kuhn et al., "Ink–Jet Printing," *Scientific American*, 162–178 (1979).
"Nacure 1051 Product Data Sheet," *King Industries Specialty Chemicals*, (1997).
"Nacure 155 Product Data Sheet," *King Industries Specialty Chemicals*, (1996).
"Nacure 2558 Product Data Sheet," *King Industries Specialty Chemicals*, (1997).
"Nacure 3327 Product Data Sheet," *King Industries Specialty Chemicals*, (1997).
"Nacure 5076 Product Data Sheet," *King Industries Specialty Chemicals*, (1989).
"Nacure X49–110 Product Data Sheet," *King Industries Specialty Chemicals*, (1997).
"Properties and Uses for Surface Coatings," *Resimene*, Solutia Inc., (1998).
"York Blown Castor Oils," *Süd–Chemie Rheologicals*, (1994).

*Primary Examiner*—Vasu Jagannathan
*Assistant Examiner*—Callie E. Shosho
*Attorney, Agent, or Firm*—Leydig, Voit & Mayer, Ltd.

[57] ABSTRACT

The present invention provides a jet ink composition suitable for application onto a substrate comprising an ink carrier, a colorant, a polyol, an aldehyde-based cross-linking agent, and a catalyst that promotes a reaction between the cross-linking agent, the polyol, and the substrate. The present invention further provides a process of jet ink printing onto a substrate comprising projecting a stream of ink droplets to said substrate, controlling the direction of the droplets so that the droplets form the desired printed image on the substrate, and heating the image to obtain a cured printed image. Examples of preferred cross-linking agents are modified melamine formaldehyde resin and modified urea formaldehyde resin. The substrates preferably possess carboxyl, hydroxyl, amide, or sulfhydryl groups. An example of a preferred substrate is cellulose. The cross-linking reaction is carried out at relatively moderate temperatures and at high speeds. The printed image has excellent adhesion to substrates, abrasion resistance, crinkling resistance, water resistance, and heat resistance.

27 Claims, No Drawings

REACTIVE JET INK COMPOSITION

TECHNICAL FIELD OF THE INVENTION

The present invention generally relates to an ink jet ink composition, and particularly to a reactive ink jet ink composition suitable for printing images on substrates having hydroxyl, carboxyl, amide, or sulfhydryl groups with improved adhesion.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed image on that surface. This technique of noncontact printing is well-suited for application of characters onto a variety of surfaces including porous and non-porous surfaces. Ink jet printing can be accomplished in a continuous mode as well as in a drop-on-demand mode.

Reviews of various aspects of ink jet printing can be found in these publications: Kuhn et al., *Scientific American*, April, 1979, 162–178; and Keeling, *Phys. Technol.*, 12(5), 196–203 (1981). Various ink jet apparatuses are described in the following U.S. Pat. Nos. 3,060,429, 3,298,030, 3,373,437, 3,416,153, and 3,673,601.

In general, an ink jet ink composition must meet one or more rigid requirements to be useful in ink jet printing operations. These relate to viscosity, resistivity, solubility, compatibility of components, and wettability of the substrate. Further, the ink must be quick-drying and smear resistant, must be capable of passing through the ink jet nozzle without clogging, and must permit rapid cleanup of the machine components with minimum effort.

In addition, the printed image should be robust and have good adhesion to the substrate. The printed image should have rub or abrasion resistance. Attempts have been made in the industry to improve these qualities by providing inks that are reactive. In many of these attempts, a reactive ink is provided which cures upon exposure to heat or UV light to provide a durable image. In these systems, the curing results in the formation of cross-links among the components of the ink. They often fail to disclose a system in which a reactive component forms a covalent bond with the printed substrate, as discussed below. For example, U.S. Pat. No. 4,978,969, discloses a method of ink jet printing using an UV curable ink composition. The ink contains an UV curable adhesive such as an urethane oligomer. The ink is jet printed onto a substrate which is then exposed to UV light to effect the curing. It is worth noting that the aforesaid UV exposure is carried out for a significantly long period of time, i.e., for about 0.5–10 minutes.

U.S. Pat. No. 5,230,733 discloses an ink composition containing a water soluble polymer-bound dye, such as a dye bound to a polymer having hydroxyl and carboxyl pendant groups, which loses water and becomes insoluble upon exposure to heat. U.S. Pat. No. 5,380,769 discloses a two-component system involving a base ink component containing a cross-linkable agent and a curing component containing a cross-linking agent. The components are applied to the receiving substrate separately. An example of a cross-linkable agent is an ethylene-acrylic acid copolymer, and an example of cross-linking agent is an amine such as diethylenetriamine. The printed image contains a product of the reaction between the cross-linkable agent and the cross-linking agent.

U.S. Pat. No. 5,738,013 discloses a method of making a lithographic plate which employs a water-insoluble printed image made by using an ink jet ink composition. The ink composition contains a liquid carrier and an organic reactive component such as a blocked isocyanate. The ink is printed on a hydrophilic receiving layer that contains a hydrophilic coating, such as a coating of polyvinyl alcohol. Upon subsequent exposure to an energy source, such as heat, a water-insoluble pattern is formed on the hydrophilic receiving layer. The printed image is then transferred to a lithographic plate. It is again worth noting that the formation of the pattern is effected under rather harsh conditions, i.e., by heating the receiving layer with a hot air gun set at 900° F. and held at 18 inches from the layer for about 5 minutes.

European Patent Application 0 672 538 discloses an ink/support medium set. The ink contains an aqueous carrier and a dye or pigment dispersion as the colorant. The support medium contains a plastic support sheet and a coating layer that contains a hydrophilic polymer, for example, polyvinyl alcohol, and a reactive component, for example, one that contains acid groups. After ink jet printing, the printed medium is exposed to an energy source, such as heat or UV, and as a result of which, the hydrophilic polymer undergoes a cross-linking reaction.

U.S. Pat. No. 4,694,302 discloses a two-part ink jet printing system, for example, wherein one part of the system contains carboxymethylcellulose, which is a known reactive polymer. The second part contains an aluminum salt. The dye can be present in either part. When the two parts are deposited on a substrate, the reaction between the carboxymethylcellulose and the aluminum salt leads to the formation of a polymer lattice which binds the dye therein, thereby forming a water-fast ink. The '302 patent also discloses a one-part ink jet printing system, for example, wherein the ink contains a colloidal suspension of carbon black in diglyme solvent and a reactive species such as sebacyl chloride. Upon deposition of the ink on a cellulose-containing substrate such as paper, the sebacyl chloride reacts with the cellulose to form a cellulosic polymer.

Thus, there exists a need for a jet ink composition containing a component that is reactive to and forms a covalent bond with the receiving substrate.

Further, as discussed above, many reactive ink jet ink compositions require long curing times and/or high temperatures to complete curing. Thus, there exists a need for a jet ink composition that cures relatively fast. There also exists a need for a jet ink composition that cures at relatively low or moderate temperatures.

These and other objects of the present invention will be apparent from the detailed description of the preferred embodiments of the invention set forth below.

SUMMARY OF THE INVENTION

The foregoing needs have been fulfilled to a great extent by the present invention which provides a jet ink composition suitable for application onto a substrate comprising an ink carrier, a colorant, a polyol, an aldehyde-based cross-linking agent, and a catalyst that promotes a reaction between the cross-linking agent, the polyol, and the substrate. The present invention further provides a process of jet ink printing onto a substrate comprising projecting a stream of ink droplets to the substrate, controlling the direction of the droplets so that the droplets form the desired printed image on the substrate, and heating the image to obtain a cured printed image.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides a jet ink composition suitable for application onto a substrate comprising an ink carrier, a colorant, a polyol, an aldehyde-based cross-linking agent, and a catalyst that promotes a reaction between the cross-linking agent, the polyol, and the substrate. The jet ink composition of the present invention contains at least one cross-linking agent which reacts with the receiving substrate to form a covalent bond thereto, and preferably, the cross-linking agent reacts with the substrate and the polyol to form covalent bonds. Thus, in a preferred embodiment, the polyol and the substrate are covalently linked through the cross-linking agent. Further, one or more of the ingredients of the jet ink composition are also capable of undergoing condensation or reaction with themselves. Thus, for example, a polyol molecule can link with one or more polyol molecules, the hydroxyl groups being linked through the cross-linking agent.

It has been found that the ink composition of the present invention provides printed images which incorporate tough, flexible, durable, abrasion resistant, water resistant, and chemical resistant high molecular weight structures. The jet ink composition is preferably a one-part system and can be printed using an ink jet printer onto a variety of substrates, preferably those containing hydroxyl, carboxyl, amide, or sulfhydryl groups. Examples of suitable substrates include polymeric substrates, preferably plastics such as cellulose, nylon, polycarbonate, and acrylics, and more preferably cellulose. The jet ink composition of the present invention can also be printed on metal and glass substrates with good print adhesion qualities.

One of the advantages of the jet ink composition of the present invention is that the cross-linking reaction can be completed in a relatively short period of time following jet printing, for example, in a period of from about 5 seconds to about 120 seconds, preferably in less than or equal to about 60 seconds, and more preferably in less than or equal to about 30 seconds. The cross-linking reaction is carried out under relatively low or moderate temperatures, e.g., at a temperature of from about 100° F. to about 400° F., preferably, less than about 350° F., and more preferably, less than about 300° F.

It has been found that the jet ink composition of the present invention is particularly useful in the printing of identification marks on cellulose-based casings such as sausage casings. A continuous ink jet printer can be installed in-line in the sausage casing production line. Such a method is advantageous over the traditional flexographic printing method using a two-component reactive ink system which is generally carried out off-line. The in-line printing method using an ink jet printer allows variable information to be placed on the substrate readily. This is not feasible readily with the off-line method. The ink jet printing also can be accomplished without harm to the contents of the cellulose casings.

The jet ink composition of the present invention can be used in continuous ink jet printers as well as in drop-on-demand ink jet printers. For use in continuous ink jet printing systems, the jet ink composition should have the following characteristics: (1) a viscosity of from about 1.6 to about 7.0 centipoises (cps) at 25° C.; (2) an electrical resistivity of from about 50 to about 2000 ohm-cm; and (3) a sonic velocity of from about 1100 to about 1700 meters/second. For example, a typical ink composition for continuous printing has the following properties: a viscosity of 3.8 cps, an electrical resistivity of 1050 ohm-cm, a pH of 2.5, a specific gravity of 0.930 g/cc, and a sonic velocity of 1300 meters/second. For use in drop-on-demand systems, the ink composition preferably has a viscosity of from about 3 cps to about 50 cps.

A detailed discussion of the ingredients and the characteristics of the inventive jet ink composition is set forth below.

Ink Carrier

Any suitable ink carrier can be employed to prepare the ink composition of the present invention. Preferably an organic solvent is used as the ink carrier. Suitable organic solvents include alcohols, esters, ketones, amides, ethers, and halides. Alcohols and ketones are preferred solvents. Particular examples of alcohols include ethanol and 1-methoxy-2-propanol. A particular example of a ketone is acetone.

Typically the carrier is present in an amount of from about 40% by weight to about 90% by weight, and preferably from about 60% by weight to about 85% by weight of the jet ink composition. A mixture of solvents can also be used. For example, a mixture of ethanol and 1-methoxy-2-propanol can be used. Ethanol and 1-methoxy-2-propanol can be present in any suitable ratio. Thus, if a mixture of ethanol and 1-methoxy-2-propanol is used, preferably, ethanol is used in an amount of from about 20% by weight to about 70% by weight of the jet ink composition and 1-methoxy-2-propanol is used in an amount of from about 20% by weight to about 60% by weight of the jet ink composition. In certain embodiments of the present invention, the ink carrier is a mixture of acetone, ethanol, and 1-methoxy-2-propanol. When such a mixture is used, acetone is preferably present in an amount of up to about 40% by weight of the jet ink composition, and ethanol and 1-methoxy-2-propanol can be present in any suitable ratio.

In certain embodiments, such as a jet ink composition for use in drop-on-demand printers, the ink carrier includes a non/low volatile organic solvent to prevent the ink from drying and clogging the jet nozzle openings. An example of such as solvent is propylene glycol. The non/low volatile organic solvent can be present in any suitable amount, for example, in an amount of up to about 70% by weight of the ink composition.

Colorant

The ink composition comprises one or more colorants that impart the desired color to the printed message. Any dye, pigment, or lake that may be dissolved or dispersed in the ink composition can be used. Dyes are particularly preferred.

Examples of dyes suitable for use in the preparation of the jet ink composition include, but are not limited to, C.I. Solvent Black 29 and C.I. Solvent Black 7 (both from Orient Chemical), C.I. Solvent Blue 70 (Orasol Blue GL, Ciba), and C.I. Solvent Red (Keyfast Spirit Red 3 BLS, Keystone Aniline). The colorant can be employed in any suitable amount, for example, in an amount of from about 0.5% to about 15% by weight of the jet ink composition, preferably in an amount of from about 3% by weight to about 8% by weight of the jet ink composition.

Polyol

The jet ink composition of the present invention comprises a polyol. Any suitable polyol—diol, triol, or higher alcohol, can be employed. The polyol has an hydroxyl number of from about 50 to about 400, preferably from about 90 to about 300. It is believed that the polyol provides the following one or more advantageous properties to the printed image. The polyol provides flexibility to the film that forms when the ink cures on the printed substrate. The polyol participates in the cross-linking reaction. The polyol improves the robustness of the image as well as adhesion of the image to the substrate. Examples of polyols include polyester polyol, polyether polyol, polyester urethane triol resin, and oxidized castor oil. Examples of suitable polyester polyols include polyester polyols such as low molecular weight linear, saturated, aliphatic structures with hydroxyl groups. The aliphatic structures can include polyester, urethane, or combinations thereof. K-FLEX™ 188 polyester polyol, available from King Industries, Inc. in Norwalk, Conn., is a preferred polyol and has an hydroxyl number of 230. K-FLEX XM 3322 polyester urethane triol resin, also available from King Industries, Inc., is another preferred polyol, and has an hydroxyl number of 95. Castor oil derived polyols also can be used. For example, oxidized castor oil polymers available from Süd-Chemie Rheologicals in Louisville, Ky., oxygenated (blown) castor oils available from The Degen Co. in Jersey City, N.J., and CASPOL™ polyols available from CasChem Inc. in Bayonne, N.J., can be used.

The polyol can be used in any suitable amount. For example, the polyol can be used in an amount of from about 0.5% to about 30% by weight of the jet ink composition, preferably in an amount of from about 1% to about 10% by weight of the jet ink composition.

Cross-Linking Agent

The jet ink composition of the present invention comprises at least one cross-linking agent, preferably one that reacts with polar groups such as hydroxyl, carboxyl, sulfhydryl, or amido. The cross-linking agent preferably is aldehyde-based, or more preferably, formaldehyde-based. Examples of suitable formaldehyde-based cross-linking agent include alkylated melamine formaldehyde resins and alkylated urea formaldehyde resins. An example of an alkylated melamine formaldehyde resin is the methylated melamine formaldehyde resin such as the hexamethoxymethylmelamine resin available as CYMEL™ 303 resin from Cytec Industries, Inc. in West Paterson, N.J. An example of an alkylated urea formaldehyde resin is the methylated urea formaldehyde resin such as the RESIMENE™ 975 resin available from Solutia Inc. in St. Louis, Mo. BEETLE™ 65, a methylated urea formaldehyde resin available from Cytec Industries, Inc., also can be used. In addition, other alkylated melamine formaldehyde resins and alkylated urea formaldehyde resins, for example, butylated melamine formaldehyde and butylated urea formaldehyde, can be used as the cross-linking agent.

The cross-linking agent can be used in any suitable amount. For example, the cross-linking agent can be used in an amount of from about 0.5% to about 30% by weight of the jet ink composition, preferably in an amount of from about 2% to about 15% by weight of the jet ink composition. In certain embodiments of the ink composition of the present invention, the cross-linking agent is present in an amount of from about 2% to about 5% by weight, and some other embodiments, the cross-linking agent is present in an amount of from about 5% to about 11% by weight of the jet ink composition.

The jet ink composition can further include a higher alcohol, e.g., n-butyl alcohol, which acts as a stabilizer for the alkylated formaldehyde resins, up to about 10% by weight of the ink composition, preferably in an amount of from about 2% by weight to about 3% by weight. It is to be noted that when a higher alcohol such as butyl alcohol is used as the ink carrier, the amount of this alcohol used to prepare the ink composition will be higher than the above-mentioned stabilizing amounts.

Catalyst

The jet ink composition of the present invention comprises a catalyst that promotes a reaction of the cross-linking agent with the substrate and the polyol. The reaction leads to covalent bond formation. Any suitable catalyst can be used, preferably an acid catalyst, and more preferably a strong acid catalyst. Examples of strong acid catalysts include sulfonic acid catalysts. Aromatic sulfonic acid catalysts are preferred. Preferred examples of sulfonic acid catalysts include dinonylnaphthalene disulfonic acid, available as NACURE™ 155 and dodecylbenzene sulfonic acid, available as NACURE 5076, from King Industries, Inc., and toluene sulfonic acid and the aromatic sulfonic acid catalyst, available as CYCAT™ 4040 and CYCAT 600, respectively, from Cytec Industries, Inc.

The catalyst can be present in the ink composition in an amount of up to about 10% by weight of the ink composition, preferably in an amount of from about 0.5% by weight to about 3% by weight of the ink composition.

Surface Active Agent

The jet ink composition of the present invention preferably includes a surface active agent. Those of ordinary skill in the art know that surface active agents improve the performance of the ink composition. For example, the surface active agent provides improved dot definition. Any suitable surface active agent, including silicones and fluoroaliphatic polyesters, can be employed. A particular example of a surface active agent is the polyester modified polydimethylsiloxane available as BYK™ 370 from BYK-Chemie USA in Wallingford, Conn. In addition to shaping the ink droplets, the hydroxyl group at the end of the polyester pendant groups participate in the cross-linking reaction and provides improved adhesion and surface properties.

The surface active agent can be present in the ink composition in an amount of up to about 5% by weight of the ink composition, preferably in an amount of from about 0.05% by weight to about 2% by weight of the ink composition, and more preferably in an amount of from about 0.1% by weight to about 0.5% by weight of the ink composition.

Conductivity Agent

Jet printing ink compositions for use in continuous ink jet printers should have a low specific resistivity, such as within the range of about 20 to about 2000 ohm-cm. The desired conductivity can be achieved by the addition of an ionizable material. Examples of such ionizable materials include ammonium, alkali, and alkaline earth metal salts such as ammonium hydroxide, lithium nitrate, lithium chloride, lithium thiocyanate, lithium trifluoromethane sulfonate, tetraethylammonium toluene sulfonate, sodium chloride, potassium chloride, potassium bromide, calcium chloride, and the like, dimethylamine hydrochloride, and hydroxylamine hydrochloride. Any suitable amount of the ionizable material can be used. Normally, an ionizable material content of up to about 5% by weight of the ink composition provides the desired conductivity.

The following examples further illustrate the present invention but, of course, should not be construed as in any way limiting its scope.

EXAMPLE 1

This Example illustrates the preparation of a black reactive jet ink composition of the present invention which is suitable for use in a continuous ink jet printer. The following ingredients were combined in the order listed and mixed for a period of 90 minutes. The resulting mixture was filtered to remove any particulates and the ink composition was recovered.

| Ingredients | % by wt. |
| --- | --- |
| Ethyl Alcohol (SDA 23A 190 proof, Quantum Chemical) | 30.9 |
| 1-Methoxy-2-Propanol (Ashland) | 46.4 |
| Lithium Nitrate (FMC Corp.) | 1.5 |
| Solvent Black 29 (Orient Chemical) | 5.6 |
| Butyl Alcohol (Ashland Chemical) | 3.0 |
| Polyester Modified Polydimethylsiloxane (BYK370, BYK-Chemie USA) | 0.1 |
| Modified Melamine-Formaldehyde Resin (CYMEL 303, Cytec Ind.) | 2.0 |
| Polyester Urethane Triol Resin (K-FLEX XM 3322, King Ind.) | 9.0 |
| Dinonylnaphthalene Disulfonic Acid (NACURE 155, King Ind.) | 1.5 |
| | 100.0 |

The ink composition was printed on a cellulose sausage casing provided by Viskase Corporation in Chicago, Illinois. The printed image was cured at a temperature of 257° F. for 30 seconds. The image had excellent water resistance and abrasion resistance. The image also had both dry and wet crinkling resistance and ink film flexibility. The wet crinkling resistance was measured after soaking the printed cellulose casing in water at about 20° C. for a period of at least 10 minutes.

EXAMPLE 2

This Example illustrates the preparation of another black reactive jet ink composition of the present invention which is suitable for use in a continuous ink jet printer. The ink composition was prepared using the following ingredients and tested as in Example 1. The image had excellent water resistance and abrasion resistance. The image also had dry and wet crinkling resistance and ink film flexibility.

| Ingredients | % by wt. |
| --- | --- |
| Ethyl Alcohol (SDA 23A 190 proof) | 30.0 |
| 1-Methoxy-2-Propanol | 46.15 |
| Lithium Nitrate | 1.5 |
| Solvent Black 29 | 5.7 |
| Butyl Alcohol | 2.0 |
| Polyester Modified Polydimethylsiloxane (BYK 370) | 0.15 |
| Modified Melamine-Formaldehyde Resin (CYMEL 303) | 10.5 |
| Oxidized Castor Oil (Süd-Chemie) | 3.0 |
| Dodecylbenzene Sulfonic Acid (NACURE 5076) | 1.0 |
| | 100.0 |

EXAMPLE 3

This Example illustrates the preparation of yet another black reactive jet ink composition of the present invention which is suitable for use in a continuous ink jet printer. The ink composition was prepared using the ingredients listed below and tested as in Example 1. The image had excellent water resistance and abrasion resistance. The image also had dry and wet crinkling resistance and ink film flexibility.

| Ingredients | % by wt. |
| --- | --- |
| Ethyl Alcohol (SDA 23A 190 proof) | 32.9 |
| 1-Methoxy-2-Propanol | 46.8 |
| Lithium Nitrate | 1.2 |
| Solvent Black 29 | 5.6 |
| Butyl Alcohol | 2.0 |
| Polyester Modified Polydimethylsiloxane (BYK 370) | 0.2 |
| Methylated Urea-Formaldehyde Resin (RESIMENE 975) | 3.0 |
| Polyester Urethane Triol Resin (K-FLEX XM 3322) | 6.0 |
| Dinonylnaphthalene Disulfonic Acid (NACURE 155) | 1.5 |
| | 100.0 |

EXAMPLE 4

This Example illustrates the preparation of a blue reactive jet ink composition of the present invention which is suitable for use in a continuous ink jet printer. The ink composition was prepared using the ingredients listed below and tested as in Example 1. The image had excellent water resistance and abrasion resistance. The image also had dry and wet crinkling resistance and ink film flexibility.

| Ingredients | % by wt. |
| --- | --- |
| Ethyl Alcohol | 50.6 |
| 1-Methoxy-2-Propanol | 25.0 |
| Lithium Nitrate | 1.2 |
| Orasol Blue GL (Ciba) | 6.0 |
| Butyl Alcohol | 2.0 |
| Polyester Modified Polydimethylsiloxane (BYK 370, BYK-Chemie USA) | 0.2 |
| Methylated Urea-Formaldehyde Resin (BEETLE 65, Cytec Ind.) | 6.0 |
| Modified Melamine-Formaldehyde Resin (CYMEL 303, Cytec Ind.) | 5.0 |
| Polyester Polyols (K-FLEX 188, King Ind.) | 3.0 |
| Toluene Sulfonic Acid (CYCAT 4040, Cytec Ind.) | 1.0 |
| | 100.0 |

EXAMPLE 5

This Example illustrates the preparation of a red reactive jet ink composition of the present invention which is suitable for use in a continuous ink jet printer. The ink composition was prepared using the ingredients listed below and tested as in Example 1. The image had excellent water resistance and abrasion resistance. The image also had dry and wet crinkling resistance and ink film flexibility.

| Ingredients | % by wt. |
| --- | --- |
| Ethyl Alcohol (SDA 23A 190 proof) | 49.0 |
| 1-Methoxy-2-Propanol | 25.0 |
| Lithium Nitrate | 1.2 |

-continued

| Ingredients | % by wt. |
|---|---|
| Keyfast Spirit Red 3 BLS (Keystone Aniline) | 6.0 |
| Butyl Alcohol | 2.0 |
| Polyester Modified Polydimethylsiloxane (BYK 370) | 0.2 |
| Modified Melamine-Formaldehyde Resin (CYMEL 303) | 11.0 |
| Oxidized Castor Oil | 3.0 |
| Dinonylnaphthalene Disulfonic Acid (NACURE 155) | 2.5 |
| | 100.0 |

EXAMPLE 6

This Example illustrates the preparation of a black reactive jet ink composition of the present invention which is suitable for use in a drop-on-demand ink jet printer. The ink composition was prepared using the following ingredients. The ink composition was printed on a cellulose sausage casing provided by Viskase Corporation in Chicago, Ill. The printed image was cured at a temperature of 257° F. for 30 seconds. The image had excellent water resistance and abrasion resistance. The image also had dry and wet crinkling resistance and ink film flexibility.

| Ingredients | % by wt. |
|---|---|
| 1-Methoxy-2-Propanol | 30.0 |
| Propylene Glycol (Ashland Chemical) | 47.3 |
| Solvent Black 29 | 4.0 |
| Butyl Alcohol (Ashland Chemical) | 4.0 |
| Polyester Modified Polydimethylsiloxane (BYK 370) | 0.2 |
| Modified Melamine-Formaldehyde Resin (CYMEL 303) | 5.0 |
| Polyester Urethane Triol Resin | 8.5 |
| Dinonylnaphthalene Disulfonic Acid (NACURE 155) | 1.0 |
| | 100.0 |

The jet ink composition of the present invention has one or more of the following advantages. The ink is a reactive ink. The ink is a one-pack or one-component system which permits ease of handling during printing operations. The ink is stable under normal storage and shipping conditions. The ink cures at high speeds at relatively moderate temperatures. The printed image covalently bonds to the substrate thereby providing superior water resistance, abrasion resistance, crinkling resistance, and superior ink film flexibility. The substrate with the printed image can therefore be subjected to mechanical manipulations without degrading the print quality.

The printed image is stable to heat. The printed image is resistant to smoke cooking and hot-cold water cycling. Thus, for example, the printed substrate can be soaked in tap water for at least 10 minutes and the images can be rubbed firmly, and, in addition, the substrate can be crinkled vigorously, without degrading the image. The printed substrate can be subjected to hot water and steam cooking conditions followed by exposure to cold tap water.

The ink has good stability with a relatively long shelf life. The ink provides superior print quality with no color off-setting, migration, or penetration. The ink jet printing method using the ink composition of the present invention provides high speed in-line printing during production.

The present invention provides a process of jet ink printing onto a substrate comprising projecting a stream of ink droplets of the present invention to the substrate and controlling the direction of the droplets so that the droplets form the desired printed image on the substrate. The printed image is then heated to complete the ink curing.

The references cited herein, including patents, patent application, and publications, are hereby incorporated by reference in their entirety.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. An ink composition suitable for application onto a substrate comprising an ink carrier including one or more alcohols, a colorant, a polyol, an aldehyde-based cross-linking agent, and a catalyst that promotes a reaction between the cross-linking agent, the polyol, and the substrate, wherein the ink composition is suitable for use as an ink jet printing ink.

2. The ink composition of claim 1, wherein said aldehyde-based cross-linking agent comprises one or more modified formaldehyde resins.

3. The ink composition of claim 2, wherein said modified formaldehyde resin is an alkylated melamine formaldehyde resin.

4. The ink composition of claim 3, wherein said alkylated melamine formaldehyde is a methylated melamine formaldehyde resin.

5. The ink composition of claim 3, wherein said polyol is selected from the group consisting of a polyester polyol, polyether polyol, polyester urethane triol resin, and oxidized castor oil.

6. The ink composition of claim 2, wherein said modified formaldehyde resin is an alkylated urea formaldehyde resin.

7. The ink composition of claim 4, wherein said alkylated urea formaldehyde is a methylated urea formaldehyde resin.

8. The ink composition of claim 7, wherein said acid catalyst is a sulfonic acid catalyst.

9. The ink composition of claim 2, wherein said cross-linking agent includes an alkylated melamine formaldehyde resin and an alkylated urea formaldehyde resin.

10. The ink composition of claim 2, wherein said cross-linking agent includes a methylated melamine formaldehyde resin and a methylated urea formaldehyde resin.

11. The ink composition of claim 10, wherein said sulfonic acid catalyst is an aromatic sulfonic acid catalyst.

12. The ink composition of claim 11, wherein said aromatic sulfonic acid catalyst is selected from the group consisting of dinonylnaphthalene disulfonic acid, dodecylbenzene sulfonic acid, and toluene sulfonic acid.

13. The ink composition of claim 2, wherein said catalyst is an acid catalyst.

14. The ink composition of claim 1, wherein said one or more alcohols include a higher alcohol.

15. The ink composition of claim 1, wherein said one or more alcohols are selected from the group consisting of ethanol, 1-methoxy-2-propanol, 2-butanol, and combinations thereof.

16. The ink composition of claim 2, wherein said colorant is selected from the group consisting of Solvent Black 29, C.I. Solvent Black 7, C.I. Solvent Blue 70, and C.I. solvent Red 91.

17. The ink composition of claim 2, wherein said composition further includes a surface active agent.

18. The ink composition of claim 17, wherein said surface active agent is a siloxane polymer.

19. The ink composition of claim 18, wherein said siloxane polymer is polyester modified polydimethylsiloxane.

20. The ink composition of claim 2, wherein said ink composition suitable for use in a continuous ink jet printing and has a Brookfield viscosity at 25° C. of from about 1.6 centipoise (cps) to about 7.0 cps, an electrical resistivity of from about 50 ohm-cm to about 2000 ohm-cm, and a sonic velocity of from about 1100 meters/second to about 1700 meters/second.

21. The ink composition of claim 2, wherein said ink composition is suitable for use in drop-on-demand printing and has a Brookfield viscosity of from about 3 cps to about 50 cps at 25° C.

22. A process of jet ink printing onto a substrate comprising projecting a stream of ink droplets to said substrate, controlling the direction of said droplets so that the droplets form the desired printed image on the substrate, and heating the image to obtain a cured printed image, wherein said ink droplets are formed from the jet ink composition of claim 2.

23. The process of claim 22, wherein said substrate is a polymeric substrate.

24. The process of claim 23, wherein said polymeric substrate has a functional group selected from the group consisting of hydroxyl, carboxyl, sulfhydryl, and amide.

25. The process of claim 23, wherein said polymeric substrate is cellulose.

26. An ink composition suitable for application onto a substrate comprising an ink carrier in an amount of from about 40% to about 90% by weight of the ink composition, said ink carrier including one or more alcohols, a colorant in an amount of from about 0.5% to about 15% by weight of the ink composition, a polyol in an amount of from about 1% to about 10% by weight of the ink composition, an aldehyde-based cross-linking agent in an amount of from about 0.5% to about 30% by weight of the ink composition, and a catalyst that promotes a reaction between the cross-linking agent, the polyol, and the substrate in an amount of up to about 10% by weight of the ink composition, wherein the ink composition is suitable for use as an ink jet printing ink.

27. A process of jet ink printing onto a substrate comprising projecting a stream of ink droplets to said substrate, controlling the direction of said droplets so that the droplets form the desired printed image on the substrate, and heating the image to obtain a cured printed image, wherein said ink droplets are formed from the ink composition of claim 26.

* * * * *

UNITED STATES PATENT AND TRADEMARK OFFICE
CERTIFICATE OF CORRECTION

PATENT NO. : 6,140,391
DATED : October 31, 2000
INVENTOR(S) : ZOU et al.

It is certified that errors appear in the above-identified patent and that said Letters Patent is hereby corrected as shown below:

[75] Inventors: "FengFei" should read --Fengfei--;
                "Palk" should read --Falk--.

Claim 7, column 10, line 41: "4" should read --6--.

Signed and Sealed this

Fifteenth Day of May, 2001

Attest:

NICHOLAS P. GODICI

Attesting Officer      *Acting Director of the United States Patent and Trademark Office*